Aug. 3, 1965 A. M. WOOSTER 3,198,937
DIGITAL POSITION-INDICATING UNITS ADAPTED FOR USE
IN APPARATUS FOR DETECTING AND SETTING THE
POSITION OF A MOVABLE OBJECT, SUCH AS A
ROTATABLE SHAFT; AND SUCH APPARATUS

Filed March 16, 1962  3 Sheets-Sheet 1

Inventor
Antony M. Wooster
by Malcolm W. Fraser
attorney

United States Patent Office 3,198,937
Patented Aug. 3, 1965

3,198,937
DIGITAL POSITION-INDICATING UNITS ADAPTED FOR USE IN APPARATUS FOR DETECTING AND SETTING THE POSITION OF A MOVABLE OBJECT, SUCH AS A ROTATABLE SHAFT; AND SUCH APPARATUS
Antony Martin Wooster, 91 North St., Burwell, Cambridge, England
Filed Mar. 16, 1962, Ser. No. 180,285
Claims priority, application Great Britain, Mar. 17, 1961, 9,935/61
10 Claims. (Cl. 235—154)

The present invention relates to digital position-indicating units adapted for use in apparatus for detecting and setting the position of a movable object, such as a rotatable shaft, and to such apparatus.

According to the invention there is provided a digital position-indicating unit comprising a plurality of successively linked sections, including a first and a last section, each of which sections comprises a plurality of sequently disposed input stator elements, each adapted to have applied to it a respective input electrical signal, and a reversibly moving part which, on continued movement without reversal, assumes in sequence each of a plurality of sequential positions, each corresponding to a respective one of the input stator elements, to each of which sequential positions the moving part returns periodically on said continued movement, the moving part of the said first of the sections being adapted for mechanical connection to, and thereby for movement proportional to movement of, a movable object whose position is to be indicated, and the moving part of each succeeding section being so connected to the respective preceding section that, on movement of the moving arm of the said preceding section from one to the other of a selected pair of mutually adjacent sequential positions thereof, and dependent on the direction of movement thereof, the moving arm of the said succeeding section is moved from that one of its sequential positions which it previously occupied to a respective one of the two positions sequentially adjacent thereto, wherein each section further comprises an output stator element and the moving part of each section is so shaped, and so disposed relative to the output stator element and to the input stator elements of the respective section, that it provides in each of its sequential positions a capacitive coupling and an absence of coupling, respectively, between the output stator element and two mutually adajacent input stator elements, of which one is that which corresponds to the respective sequential position of the moving part, and that it further provides, between the output stator elements and each of the remaining input stator elements of the respective section, a coupling relationship which is the same as that between the output stator element and the other of the two said mutually adjacent input stator elements; whereby the output stator element of each section, in each sequential position of the moving part of that section, is in a coupling relationship with the respective corresponding input stator element of that section which is distinctively different from its coupling relationship with each of the other input stator elements thereof.

According to the invention there is further provided apparatus for detecting and setting the position of a movable object, comprising a signal generator having a series of output channels and adapted to provide simultaneously a corresponding series of output electrical signals of generally similar character but distinguished from one another by serially progressive differences of one of three characteristics thereof, namely amplitude, frequency and phase; a position-indicating unit as recited in the preceding paragraph, the input stator elements of each section thereof being connected each to a respective one of the signal generator output channels, in such manner that each input stator element of a section, except those two input stator elements to which correspond the said selected pair of mutually adjacent sequential positions of the moving part of that section, is connected to a signal generator output channel which is serially between the two output channels thereof to which the sequentially preceding and sequentially following input stator elements of that section are respectively connected, whereby each section of the position-indicating unit is adapted to provide at its output conductor an output signal which is distinctive of the sequential position of its moving part; a plurality of position-selector switches, each corresponding to a respective one of the sections of the position indicating unit, each having a plurality of input terminals of which each correspond to a respective one of the input stator elements of that section and is connected to the same signal generator output channel thereas; an output terminal for each position-selector switch, connectable to any selected one of the input terminals thereof, whereby each position-selector switch is adapted to provide at its said output terminal an output signal which is distinctive of the selected one of its input terminals, comparator means adapted to compare an output signal from a section of the position-indicating unit with an output signal from the corresponding position-selector switch and to provide three mutually alternative output indications, indicating respectively that the output signal from the section of the position-indicating unit is distinctive of an input stator element thereof which is connected to a signal generator output channel which is serially before, the same as, and serially after the output channel to which is connected that input terminal of the position-selector switch to which the output terminal thereof is also connected; reversible motor means operatively connected to vary the position of the said movable object whose position is to be set; motor switch means responsive to the said output indications of the comparator means to energise the motor means so as to move the said movable object in the direction required to produce the second-mentioned output indication of the comparator means and, on such second-mentioned output indication being provided by the comparator means, to stop the motor means; and comparator input switch means adapted to apply to the comparator means first the output signals from the last section of the position-indicating unit and from the position-selector switch corresponding thereto and then, in turn, the output signals from each other section and from the respective position-selector switch, in inverse succession ending with the first section and the position-selector switch corresponding thereto.

Preferred embodiments of a position-indicating unit, and of position detecting and setting apparatus, in accordance with the invention are described below with reference to the accompanying drawings in which.

Figure 1:
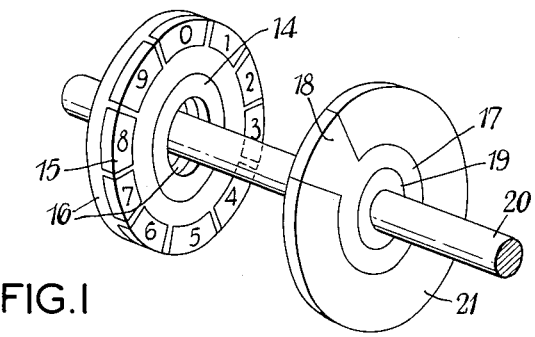
FIGURE 1 is an exploded perspective view of parts of a section of a digital position-indicating unit in accordance with the invention.
Figure 5:
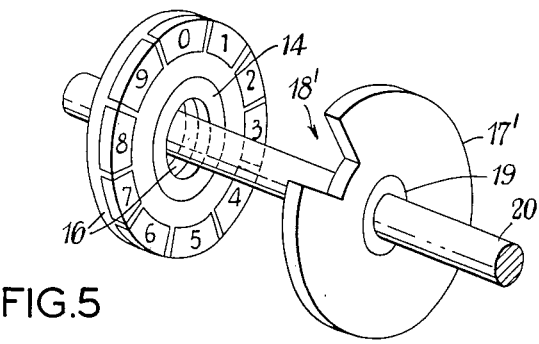
Figure 6:
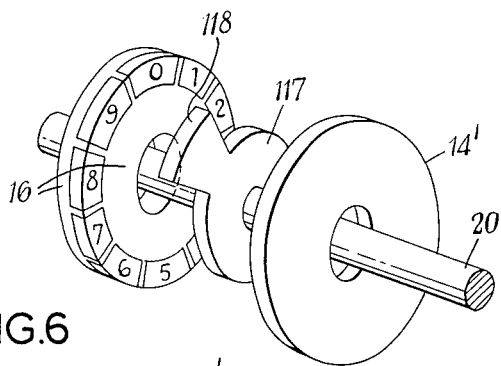
Figure 7:
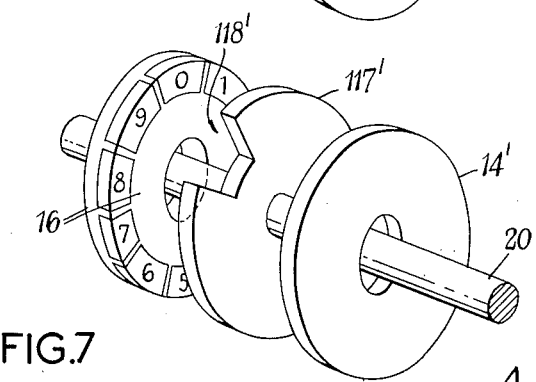

FIGURES 5, 6 and 7, similar to FIGURE 1, each show a section of a respective modified position-indicating unit in accordance with the invention.

Figure 2:
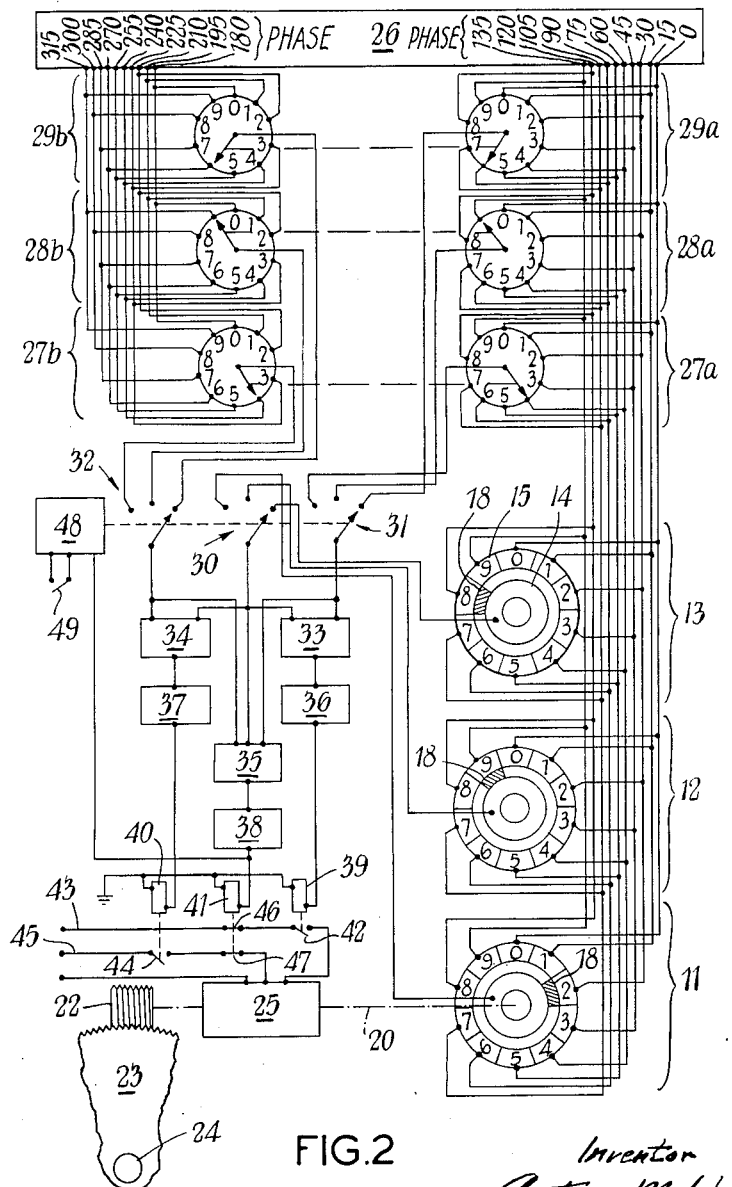
FIGURE 2 shows a general circuit diagram of apparatus, according to the invention and including a position-indicating unit in accordance with FIGURE 1, for detecting and setting the position of a movable object, namely a rotatable shaft.

The apparatus shown in FIGURE 2 comprises a position-indicating unit which comprises three similar sections 11, 12 and 13, parts of one of which are shown diagrammatically in FIGURE 1. Each of these sections comprises a stator which includes a circular output stator element 14 and ten circularly disposed input stator elements 1, 2 . . . 9, 0 which are arranged sequentially in the form of another ring 15 concentric or coaxial with the ring 14. Each of the ten input stator elements, which are electrically conductive, is insulated from the others and from the output stator element 14, which is also electrically conductive. Conveniently, the ring 14 and the segments of the ring 15 are recessed into one face of an apertured circular disc 16 of insulating material by which they are thus supported in their correct relative positions. Each of the sections also comprises a moving part, namely a rotor which includes an electrically conductive ring 17 formed with a projection 18, the ring 17 being mounted by means of an insulating bush 19 on a shaft 20 which passes through the aperture of the insulating disc 16. The ring 17 is preferably surrounded by a C-shaped piece 21 of insulating material which, with the projection 18, gives the rotor a circular periphery.

For the purpose of the foregoing description, the stator and rotor as shown in FIGURE 1 are widely separated, but when assembled in a section of the position-indicating unit they are only slightly spaced, with the output stator element 14 and the ring 17, which are of equal size facing one another as the plates of a condenser. The rotor is rotatable with the shaft 20 on which it is mounted, so that the projection 18 can similarly form a condenser with each in turn of the ten input stator elements of the stator. Thus, by rotation of the rotor, each in turn of the ten input stator elements can be capacitatively coupled to the output stator ring 14; it will be noted that this selective coupling of the input stator elements to the output element 14 does not involve the use of any sliding electrical contacts, the projection 18 serving as a selective capacitative coupling member.

In the complete position-indicating unit, the sections are successively linked to one another by means of Geneva motions or other convenient equivalents (not shown), so that, as the coupling member 18 of the rotor of one section moves from one to the other of the positions in which it couples the corresponding output stator element 14 to the input stator segments 9 and 0 respectively, the rotor of the next section is rotated so that its coupling member 18 is moved backwards or forwards, as the case may be, by one input stator element of that next section. The shaft 20 of the first of the successive linked sections of the position-indicating unit is provided with means to connect it with a movable object, in the illustrated case a rotatable shaft, whose position is to be digitally indicated. For instance, the shaft 20 of the first section of the position-indicating unit may be connected to a worm of a worm gear to rotate at equal speed therewith, the worm meshing with a 360-tooth worm wheel which rotates 1° for each revolution of the worm and which is secured on a shaft whose angular position is of interest. In that case, movement of the coupling member 18 of the first section of the position-indicating unit from one to the next of the input stator elements of that section corresponds to a rotation of 0.1° by the shaft whose position is of interest; and due to the successive linking of the sections of the position-indicating unit, the rotors of the second and third sections move in steps corresponding to changes of 1° and 10° respectively, in the angular position of the shaft.

As indicated in FIGURE 2, the section 11 of the position-indicating unit is connected as just described through a worm 22 to a 360-tooth worm wheel 23 of which only a fragment is shown, the worm wheel 23 being secured on a shaft 24 whose angular position is of interest, for rotation therewith. As shown in FIGURE 2 the worm 22 and the shaft 20 of the section 11 of the sensing unit are arranged to be driven, together, by a reversible electric motor 25 to which further reference is made below. For the sake of clarity of the drawings only the coupling members 18 of the rotors of the sections 11, 12 and 13 are indicated (schematically) in FIGURE 2, the rotor rings 17 being omitted; and the mechanical linkages between the sections 11 and 12 and between the sections 12 and 13 respectively are also omitted, though it will be understood from the foregoing description that as the coupling member 18 of the section 11 (or 12) moves from its input stator element 9 to its input stator element 0, or vice versa, the coupling member 18 of the section 12 (or 13) is caused to move from the input stator element thereof with which it had previously been coupled to the adjacent input stator element of higher (or respectively, lower) number.

As shown in FIGURE 2, corresponding input stator elements of all the sections of the position-indicating unit are connected together and to a corresponding one of ten output channels of a square-wave generator 26. The generator 26 generates a series of ten corresponding square-wave output signals, of equal frequency but progressively differing phase, the phase of that connected to the input stator elements 1 of the position-indicating unit being in advance of that connected to the input stator elements 0, and so on, and the greatest phase difference, between the said ten output signals applied to the input stator elements 9 and 0 respectively, being less than 180°. Preferably the phase-differences between any two serially adjacent generator output channels are equal; and where, as in the circuit shown in FIGURE 2, there are ten such outputs, the phase-difference between the outputs connected to any two sequentially mutually adjacent input stator elements of a section of the position-indicating unit may be 15°, so that the phase of the output signal applied to the input stator element 9 is 135° in advance of that to the respective input stator element 0. Since the rotor of each position-indicating unit section capacitatively couples the output stator element 14 thereof to one of the input stator elements thereof in dependence on the position of its selective coupling member 18, it will be apparent that there appears at the output stator element 14 an output signal consisting of alternate positive- and negative-going pulses, corresponding with the leading and trailing edges of the pulses of the square wave applied to that one of the input stator elements and that the phases of, say, the positive pulses appearing at the output stator elements 14 represent a digital indication of the angular position of the shaft 24.

As further shown in FIGURE 2, there are provided three ganged pairs of ten-way position-selector switches 27a and 27b, 28a and 28b, and 29a and 29b. Each of the three position-selector switches 27a, 28a and 29a has a 0 position in which its output terminal is connected to a 0 input terminal which is connected to the same output channel of the generator 26 as the input stator elements 0 of the position-indicating unit, and 1, 2, 3 . . . 9 positions in which its output terminal arm is correspondingly connected to corresponding other input terminals connected to the same generator output channels as the input stator elements 1, 2, 3, . . . 9 respectively. The switches 27b, 28b and 29b have corresponding 0, 1, 2 . . . 9 positions and input terminals, but these latter, complementary input terminals are connected not to the ten generator output channels already described but to respective ones of a further series of ten generator output channels each of which is 180° out of phase with the corresponding one of the first series; and correspondingly the output signal appearing at the output terminal of the switch 27a, for example, is 180° out of phase with that appearing at the complementary output terminal of the switch 27b.

The output stator elements 14 of the three sections of the position-indicating unit are connected to respective input terminals of a three-way switch 30; and the output terminals of the three position-selector switches 27a, 28a and 29a, and the three complementary output terminals of the switches 27b, 28b and 29b, are connected correspondingly to the respective input terminals of three-way switches 31 and 32, which are ganged to the switch 30 and constitute therewith input switch means for comparator means now to be described.

The comparator means comprises three "AND" gates 33, 34 and 35 to the inputs of which the output terminals of the switches 30, 31 and 32 are connected. Specifically, the gate 33 has two inputs, to which the output terminals of the switches 30 and 31 are respectively connected; the gate 34 also has two inputs, to which the output terminals of the switches 30 and 32 are respectively connected; and the gate 35 has three inputs to which the output terminals of the switches 30, 31 and 32 are respectively connected. Each of these three "AND" gates provides an output signal only when it is receiving a positive input signal at each of its inputs simultaneously; and output signals from the gates are applied to electronic switches 36, 37 and 38 respectively which are also comprised by the comparator means and which, when operative, energise relays 39, 40 and 41 respectively, which together constitute switch means for the motor 25. The relay 39, when energised, closes an otherwise open switch contact 42 in one power lead 43 for the motor 25, to energise the motor 25 for rotation in one direction; the relay 40, when energised, closes an otherwise open switch contact 44 in a second power lead 45, energising the motor for rotation in the other direction; and the relay 41, when energised, opens two otherwise closed switch contacts 46 and 47 in the leads 43 and 44 respectively, so that the motor 25 is then switched off and stationary.

The apparatus as above described enables the shaft 24 to be set to a desired digitally-expressed angular position. When, for example, the coupling members 18 of the sections, 11, 12 and 13 of the position-indicating unit are in their positions shown in FIGURE 2, this indicates that the shaft 24 is at an angular position of 89.2° relative to some reference position (namely the angular position which it must assume to set each of the coupling members 18 against the input stator element 0 of its respective section 11, 12 or 13). If it is desired to set the shaft 24 to a new angular position of 69.4° relative to the reference position, the switches 27a and b, 28a and b, and 29a and b are set to the positions in which they are shown in FIGURE 2.

Figure 3:
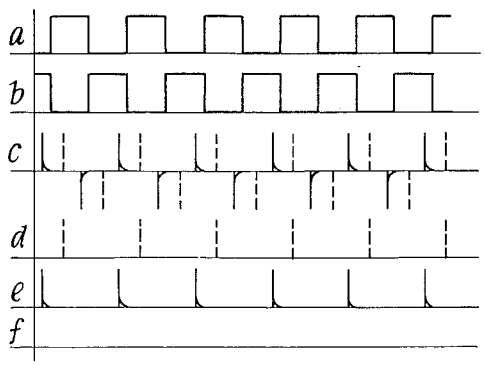
FIGURE 3 is a representation of electrical signals occuring, in given conditions, in various parts of the circuit shown in FIGURE 2.

The switches 30, 31 and 32 of the comparator input switch means are first also set to the positions in which they are shown in FIGURE 2, and the signals which then appear at the output terminals of the switches 30, 31 and 32 are as indicated in full lines in FIGURE 3. In FIGURE 3, curves a and b indicate the two oppositely-phased square waves which are applied to the output terminals of the switches 31 and 32 respectively, through the switches 29a and 29b respectively (both of these latter being in their 6 positions). The phase of the square wave applied to the input stator element 8 of the section 13 of the position-indicating unit is 30° in advance of the phase of curve a, and accordingly the short positive-going pulses of the alternate positive- and negative-going pulses (shown by a curve c in full lines) which appear at the output stator element 14 of the position-indicating unit section 13, and thus at the output terminal of the switch 30, occur between square-wave pulses of curve a (i.e. during square-wave pulses of wave b). The square wave of curve a is applied to the gates 33 and 35, but since only negative-going pulses occur at the output terminal of the switch 30 during the square-wave pulses of curve a, neither of these gates produces an output; this is indicated by the absence of any (full-line) curves d or f respectively in FIGURE 3. However, during each square-wave pulse of the curve b which is applied from the output terminal of the switch 32 to the gate 34, one of the short positive-going pulses appearing at the output terminal of the switch 30 is also applied to the gate 34, which therefore produce an output pulse corresponding to each positive-going pulse from the output terminal of the switch 30. The output of the gate 34 is thus as shown by the curve e.

Figure 4:
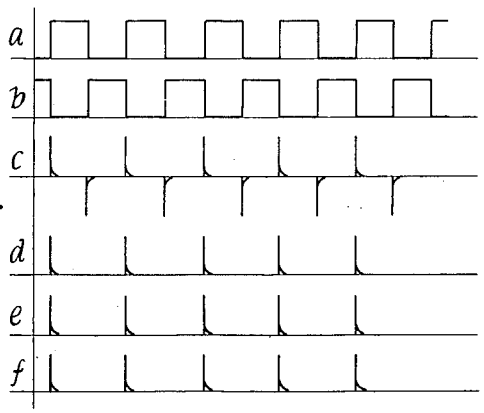
FIGURE 4 is similar to FIGURE 3, in respect of a different condition.

Since the gates 33 and 35 have no output, the switches 36 and 38 also produce no output; thus the relays 39 and 41 remain unenergised and the contact 42 remains open and the contacts 46 and 47 remain closed. However, so long as the gate 34 has an output, consisting (as shown by the curve e) of a train of short pulses, the switch 37 delivers a continuous output which maintains the relay 40 energised and the contact 44 closed. This energises the motor 25 for rotation of the shaft 24 in the direction to reduce the magnitude of its angular displacement from the reference position. When the motor 25 has made 9.2 revolutions, and the shaft 24 has correspondingly been rotated through 9.2°, to an angular position of 80°, the rotors of the sections 11 and 12 of the postion-indicating unit are both in the 0 position; and as the rotation continues, the rotor of the section 13 is displaced from its 8 position to its 7 position. This merely causes the short pulses of the curve C (full line) and e of FIGURE 3 to occur 15° later than before, relative to the phases of the curves a and b, but still during the pulses of the curve b. The contact 40 therefore remains closed, and the rotation of the motor 25 and shaft 24 continues until the angular position of the shaft 24 is only 69.9°. As the shaft moves to this position from its 70.0° position, the rotor of the section 13 moves from its 7 position to its 6 position, and the pulses of the curve c of FIGURE 3 then slip back by a further 15° relative to the phase of the curves a and b. The positive-going pulses of the curve c then occur at the same instance as the leading and trailing edges of the square-wave pulses of the curves a and b respectively, as shown in FIGURE 4; and since the said leading and trailing edges are not quite vertical, signals are simultaneously present at the output terminals of all three switches 30, 31 and 32. Correspondingly, signal is applied simultaneously to both inputs of each of the gates 33 and 34, and to all three inputs of the gate 35, so that all three gates 33, 34 and 35 produce outputs as indicated by the curves d, e and f of FIGURE 4. The switches 36, 37 and 38 are thus all actuated and produce continuous outputs to energise the relays 39, 40 and 41 respectively. Thus, although the contacts 42 and 44 are then both closed, the contacts 46 and 47 are both opened and rotation of the motor 25 ceases, having set the shaft 24 at an angular position of 69.9°.

Thus the shaft 24 has been set to a digitally indicated position which, in respect of its first digit, agrees with the desired position as digitally expressed by the setting of the switches 29a and b, 28a and b and 27a and b.

If the shaft had originally been at a position which was digitally expressed by a smaller number (say 29.2°, instead of 89.6° as considered above) the positive short pulses of the curve c of FIGURE 3 would have been initially in the positions shown by broken lines, i.e. 60° in phase behind the leading edges of the square-wave pulses of the curve a. In that case, the gate 34 would have had no output, but the gate 33 would have had an output as represented by the broken lines of curve d. The switch 36 would thus have been actuated to energise the relay 39 and close the contact 42 in the power lead 43 for the motor 25, which would thus have been rotated, in the opposite direction from that described above, to increase the displacement of the shaft 24 from its reference position. As the shaft 24 was rotated, the rotor of the position-indicating unit section 13 would have moved sequentially into its 3, 4 and 5 positions, and at each such move the pulses of the curve c would have advanced 15° relative to the phase of the curve a; until, as the rotor of the section 13 moved into its 6 position (indicating a position of 60.0° for the shaft 24), the positive-going pulses of the curve c would have coincided with the leading and trailing edges of the square-wave pulses of the curves a and b respectively, and the rotation of the motor 25 would have ceased as already described. Thus, again, the position of the shaft 24 would have been set to the chosen 10° range.

The chosen 10° range having been reached from either above or below, the switches 30, 31 and 32 are set to their next position to connect in the switches 28a and b and the position-indicating unit section 12; and by this means the position of the shaft 24 is set, in the same manner, to the chosen 1° range of the 10° range already achieved. Similarly, by then setting the switches 30, 31 and 32 to their third position, to bring the section 11 and the switches 27a and b into use, the position of the shaft 24 is finally set to a position which is correct within 0.1° of that selected digitally by the position-selecting switches.

It will be appreciated that although the position-indicating unit has been shown with only three sections (11, 12 and 13) and, correspondingly, the comparator input switches 30, 31 and 32 with only three positions each, to connect with only three pairs of switches 27a and b etc., this is a mere matter of choice. If the angular position were to be expressed by a five-figure digit, the first and last digits representing multiples of 100° and of 0.01° respectively, the switches 30, 31 and 32 would be five-position switches, there would be provided five, instead of three, pairs of switches like the switches 27a and b respectively, and the position-indicating unit would have five sections, appropriately geared to the shaft 24, instead of three.

Further it will be appreciated that the invention is not restricted to digital expressions in terms of the radix 10 or even to the use of a single numerical radix for all the digits. For instance, if the section 11 of the position-indicating unit had only six segments, instead of the ten shown in FIGURE 2 and described above, it would yield a digital expression in terms of multiples of 10′ instead of multiples of 0.1°. In that case the six input stator elements of the modified section 11 could be connected sequentially to any serially selected six of the ten output channels of the generator 26 to which the section 11 is shown connected, e.g. to those shown connected to the segments 1, 2, 3, 4, 5, 6, or to those shown connected to the segments 0, 2, 3, 5, 7, 9; and the switch positions 1 to 6 of the switches 27a and b would be connected to the same six output channels and, respectively, to the six output channels provided with output signals of directly opposite phase. If the six-position section, instead of being geared to the shaft directly, were instead driven by a preceding section geared to the shaft, that preceding section would preferably be a ten-position section geared to occupy each of its ten positions once in response to a 10′ rotation of the shaft. The six-position section would then indicate 10′ intervals, the preceding section 1′ intervals, and the succeeding section 1° intervals, of the rotational position of the shaft.

It will be further appreciated that the switching of the switches 30, 31 and 32 of the comparator input switch means can be performed automatically by the output from the switch 38 which energises the relay 41; and this is indicated schematically in FIGURE 2 by a switch-control device 48 which is connected to be actuated by the switch 38. The device 48 would be provided with a starting switch 49 which would be actuated manually, after the switches 27a and b, etc. had been set to represent digitally a desired angular position of the shaft, to cause the device 48 to set the switches 30, 31 and 32 to their first position. When the first digital position had been established, the motor 25 would be switched off automatically as already described, and simultaneously the device 48 would be actuated to move the comparator input switches into the second position. This process would repeat automatically until the desired angular position of the shaft 24 had been established in all its digits, and no further change would then occur until the switch 49 was again actuated, following alteration of at least one of the position-selector switches.

Although, as described above, the greatest phase difference between square-waves applied to the input stator elements of the position-indicating unit was less than 180°, it might, within the scope of the invention, be equal to 180°, the phases advancing in steps of 20°. In that case, the phases of the other ten output signals of the generator 26 would be made not exactly 180° different from the respective phases of the first ten output signals, in order that (referring to FIGURE 3 or FIGURE 4) there should be a definite overlap (say 5°) between the fronts of the square-wave pulses of curve a and the backs of the respective proceeding square-wave pulses of curve b, and, correspondingly, a definite interval between the trailing edge of a pulse of curve a and the leading edge of the next pulse of curve b. Also, this relative displacement of the curves a and b out of their exact opposite-phase relationship could, if desired, be provided even where such displacement is not required by two of the square waves applied to the position-indicating unit being 180° out of phase. The switching off of the motor 25 would not then depend on the square-waves being not quite square.

A particular embodiment of a digital position-indicating unit according to the invention, and of apparatus, according to the invention and including that embodiment of a position-indicating unit, for detecting and setting the position of a rotatable shaft, have been described above. However, other embodiments of a position-indicating unit are possible within the scope of the invention, and three such other inventions will be described with reference to FIGURES 5, 6 and 7 of the drawings, each of which shows, comparably with FIGURE 1, an exploded view of parts of one section of a respective embodiment.

In the embodiment of which one section is represented in FIGURE 5, each section comprises input stator elements 0, 1, . . . 9, and an output stator element 14, all mounted on an apertured insulating disc 16 in exactly the same manner as shown in FIGURE 1. In FIGURE 5, however, the moving part which is mounted on the shaft 20 for rotation therewith is such as to couple all except one of the input stator elements to the output stator elements. To this end, the moving part comprises a disc 17′ which is supported on the shaft 20, but insulated therefrom, by an insulating bush 19, and which is of such diameter that it is capacitively coupled not only to the output stator element 14 but also to each of the input stator elements except that one of them which, in a given position of the moving part, is adjacent to a notch 18′ provided at the periphery of the ring. It will be apparent that each of ten sequential positions of the moving part of the section is distinguished from the others by an absence, at the output stator element, of any signal derived from the respective excepted input stator element.

In the embodiments of which respective sections are shown in FIGURES 6 and 7, the output stator element 14 is omitted from the disc 16 and is constituted instead by an apertured conducting disc 14′ through which the shaft 20 passes and which is disposed parallel with the disc 16 so as to be capacitively coupled with each of the input stator elements, in the absence of the moving part now to be described. In the FIGURE 6 embodiment, the moving part comprises a conducting disc 117 mounted, between the discs 14′ and 16, on the shaft 20 for rotation therewith, and earthed therethrough. The disc 117 has a peripheral projection 118 which, in each of the sequential positions of the moving part, forms a condenser with a respective one of the input stator elements and, being earthed, screens it from the output stator disc 14′. The output signals appearing at the output stator element 14′ therefore correspond to those in the embodiment shown in FIGURE 5. The section shown in FIG- URE 7 differs from that shown in FIGURE 5 in that the moving part comprises a disc 117' moving with and earthed through the shaft 20, which is formed with a notch 118' and in each sequential position screens all except a respective one of the input stator elements from the output stator element 14'. The output signals appearing at the output stator element of the FIGURE 7 emobdiment correspond, therefore, to those of the FIGURE 1 embodiment.

In general, it will be observed, the four embodiments of a position-indicating unit according to the invention of which respective sections are shown in FIGURES 1, 5, 6 and 7 have in common the basic feature that the moving part of each section is so shaped, and so disposed relative to the output stator element and to the input stator elements of the respective section, that it provides in each of its sequential positions a capacitive coupling and an absence of coupling, respectively, between the output stator element and two mutually adjacent input stator elements, of which one is that which corresponds to the respective sequential position of the moving part, and that it further provides, between the output stator element and each of the remaining input stator elements of the respective section, a coupling relationship which is the same as that between the output stator element and the other of the two said mutually adjacent input stator elements, whereby the output stator element of each section, in each sequential position of the moving part of that section, is in a coupling relationship with the respective corresponding input stator element of that section which is distinctively different from its coupling relationship with each of the other input stator elements thereof. The basic feature common to all these rotary position-indicating units could also be provided, according to the invention, by a position-indicating unit in which the input stator elements of each section were disposed linearly, and traversed in sequence by a linearly-moving part provided with a quick return from the last to the first, and vice versa, of the input stator elements.

It will be appreciated that, in the circuit shown in FIGURE 2, the position-indicating unit in accordance with FIGURE 1 could be replaced by a position-indicating unit in accordance with FIGURE 7 without other modification of the circuit being required in consequence. It will be apparent that if a position-indicating unit in accordance with FIGURE 5 or FIGURE 6 were employed instead, the gates 33, 34 and 35 would require corresponding modification.

Although the invention has been described in the foregoing with particular reference to the use of square-wave signals distinguished from one another by their relative phases, it will be apparent that, by suitable design of the comparator means, in particular by suitable design of the elements thereof which in the above-described embodiment are embodied by the "AND" gates 33, 34 and 35, the square-wave generator 26 could be one whose output signals were distinguished from one another not by their relative phases but by their respective amplitudes or frequencies. Again, although in the described embodiment it is preferred to compare each output signal of a section of the position-indicating unit simultaneously with two output signals, one complementary with the other, from the position-selector switch means, it would in general be possible, within the scope of the invention, to dispense with the complementary signals and to compare each output signal from a section of the position-indicating unit with one of only a single series of output signals from the position-selector switches.

What I claim is:

1. Apparatus for detecting and setting the position of a movable object, comprising: a signal generator having a series of output channels and adapted to provide simultaneously a corresponding series of output electrical signals of generally similar character but distinguished from one another by serially progressive differences of one of three characteristics thereof, namely amplitude, frequency and phase; a digital position-indicating unit comprising a plurality of successively linked sections, including a first and a last section, each of which sections comprises a plurality of sequentially disposed input stator elements, each adapted to have applied to it a respective input electrical signal, and a reversibly moving part which, on continued movement without reversal, assumes in sequence each of a plurality of sequential positions, each corresponding to a respective one of the input stator elements, to each of which sequential positions the moving part returns periodically on said continued movement, the moving part of the said first of the sections being adapted for mechanical connection to, and thereby for movement proportional to movement of, the movable object whose position is to be indicated, and the moving part of each succeeding section being so connected to the respective preceding section that, on movement of the moving arm of the said preceding section from one to the other of a selected pair of mutually adjacent sequential positions thereof, and dependent on the direction of movement thereof, the moving arm of the said succeeding section is moved from that one of its sequential positions which it previously occupied to a respective one of the two positions sequentially adjacent thereto, each section further comprising an output stator element and the moving part of each section being so shaped, and so disposed relative to the output stator element and to the input stator elements of the respective section, that in each of its sequential positions it provides between the output stator element and the input stator element which corresponds to that sequential position one of two relationships, namely a capacitive coupling and an absence of such coupling, and between the output stator element and each other input stator element the other of those two relationships, and the input stator elements of each section being connected each to a respective one of the signal generator output channels, in such manner that each input stator element of a section, except those two input stator elements to which correspond the said selected pair of mutually adjacent sequential positions of the moving part of that section, is connected to a signal generator output channel which is serially between the two output channels thereof to which the sequentially preceding and sequentially following input stator elements of that section are respectively connected, whereby each section of the position-indicating unit is adapted to provide at its output conductor an output signal which is distinctive of the sequential position of its moving part; a plurality of position-selector switches, each corresponding to a respective one of the sections of the position-indicating unit, each having a plurality of input terminals of which each corresponds to a respective one of the input stator elements of that section and is connected to the same signal generator output channel thereof; an output terminal for each position-selector switch, connectable to any selected one of the input terminals thereof, whereby each position-selector switch is adapted to provide at its said output terminal an output signal which is distinctive of the selected one of its input terminals; comparator means adapted to compare an output signal from a section of the position-indicating unit with an output signal from the corresponding position-selector switch and to provide three mutually alternative output indications, indicating respectively that the output signal from the section of the position-indicating unit is distinctive of an input stator element thereof which is connected to a signal generator output channel which is serially before, the same as, and serially after the output channel to which is connected that input terminal of the position-selector switch to which the output terminal thereof is also connected; reversible motor means operatively connected to vary the position of the said movable object whose position is to be set; motor switch means responsive to the said output indications of the comparator means to energise the motor means so as to move the said movable object in the direction required to produce the second-mentioned output indication of the comparator means and, on such second-mentioned output indication being provided by the comparator means, to stop the motor means; and comparator input switch means adapted to apply to the comparator means first the output signals from the last section of the position-indicating unit and from the position-selector switch corresponding thereto and then, in turn, the output signals from each other section and from the respective position-selector, in inverse succession ending with the first section and the position-selector switch corresponding thereto.

2. Apparatus as claimed in claim 1, wherein the signal generator is adapted to produce square-wave output signals having a common frequency but progressively displaced in phase, the greatest phase difference between the output signals in any two output channels to which input stator elements of the position-indicating unit are connected being not more than 180°.

3. The apparatus as claimed in claim 2, wherein each position-selector switch is a double switch having, in addition to the said output terminal and the said input terminals, a complementary output terminal and a set of complementary input terminals each corresponding to a respective one of the said input terminals and connected to a signal generator output channel in which the phase of the output signal differs from the phase of the output signal in the output channel to which the corresponding one of the said terminals is connected by an amount which differs from 180° by less than the phase-difference between the output signals in any two serially adjacent output channels of the signal generator, and wherein the comparator means is adapted to compare the output signal from a section of the position-indicating unit with output signals from both the said output terminal and the said complementary output terminal of a respective position-selector switch.

4. Apparatus as claimed in claim 1, wherein the input stator elements of each section of the position-indicating unit are disposed circularly about an axis of the section, and the moving part is mounted for rotation about the said axis, adjacent the input stator elements but spaced therefrom.

5. Apparatus as claimed in claim 4, wherein the moving part of each section comprises a generally circular disc having a peripheral projection which, as the moving part rotates, moves into closely-spaced relationship with each in turn of the input stator elements to constitute therewith a condenser.

6. Apparatus as claimed in claim 5, wherein the output stator element of each section is in closely spaced relationship with the disc of the moving part and constitutes therewith a condenser, being thereby capacitively coupled to each in turn of the input stator elements of the respective section.

7. Apparatus as claimed in claim 5, wherein the disc and projection of the moving part of each section is earthed and the output stator elements is disposed, with the disc between it and the input stator elements, in closely spaced relationship with the input stator elements so as to constitute with each input stator element, except that with which the projection of the disc constitutes a condenser, a condenser and to be capacitively coupled thereto.

8. Apparatus as claimed in claim 4, wherein the moving part of each section comprises a generally circular disc having a peripheral notch, the notched periphery of the disc being in closely spaced relationship with each of the input stator elements except that which, in dependence on the position of the moving part, is adjacent the notch, and constituting therewith plurality of respective condensers.

9. Apparatus as claimed in claim 8, wherein the output stator element of each section is in closely spaced relationship with the disc of the moving part and constitutes therewith a condenser, being thereby capacitively coupled in each sequential position of the moving part to each except a respective one of the input stator elements of the respective section.

10. Apparatus as claimed in claim 8, wherein the disc of the moving part of each section is earthed and the output stator elements is disposed, with the disc between it and the input stator elements, in closely spaced relationship with the input stator elements so as to constitute with that one of the input stator elements which is adjacent the notch of the disc a condenser and to be capacitively coupled thereto.

References Cited by the Examiner

UNITED STATES PATENTS

| | | | |
|---|---|---|---|
| 2,678,435 | 5/54 | Vaughan | 317—250 |
| 2,679,551 | 5/54 | Newby | 317—250 |
| 2,701,357 | 2/55 | Newby | 340—364 |
| 2,899,621 | 8/59 | Bauer | 318—467 |
| 2,969,490 | 1/61 | Anderson et al. | 318—162 |

MALCOLM A. MORRISON, *Primary Examiner.*